(12) United States Patent
Cole

(10) Patent No.: US 12,066,116 B2
(45) Date of Patent: Aug. 20, 2024

(54) DOUBLE FLOW RATE GAS SOLENOID VALVE

(71) Applicant: Brandon William Cole, Itasca, IL (US)

(72) Inventor: Brandon William Cole, Itasca, IL (US)

(73) Assignee: Robertshaw Controls Company, Itasca, IL (US)

( * ) Notice: Subject to any disclaimer, the term of this patent is extended or adjusted under 35 U.S.C. 154(b) by 70 days.

(21) Appl. No.: 17/726,966

(22) Filed: Apr. 22, 2022

(65) Prior Publication Data

US 2022/0390028 A1    Dec. 8, 2022

Related U.S. Application Data

(60) Provisional application No. 63/195,880, filed on Jun. 2, 2021.

(51) Int. Cl.
| | |
|---|---|
| *F16K 11/24* | (2006.01) |
| *F16K 31/06* | (2006.01) |
| *F23N 1/00* | (2006.01) |

(52) U.S. Cl.
CPC .......... *F16K 11/24* (2013.01); *F16K 31/0624* (2013.01); *F23N 1/007* (2013.01); *F23N 2235/14* (2020.01); *F23N 2237/10* (2020.01)

(58) Field of Classification Search
CPC ...... F16K 11/22; F16K 11/24; F16K 31/0624; F23N 1/007
USPC .......................................... 137/625.4, 625.33
See application file for complete search history.

(56) References Cited

U.S. PATENT DOCUMENTS

| | | | | |
|---|---|---|---|---|
| 1,121,730 | A | * | 12/1914 | Keely ..................... F16K 11/22 137/886 |
| 2,644,476 | A | * | 7/1953 | Smith ................... D06F 39/088 251/38 |
| 4,463,969 | A | * | 8/1984 | Harrison ............ B60G 17/0152 280/DIG. 1 |
| 4,718,448 | A | * | 1/1988 | Love ....................... F23N 1/005 137/271 |
| 4,802,507 | A | * | 2/1989 | Willson ............. G05D 16/0655 137/505.12 |
| 5,469,885 | A | * | 11/1995 | Nishimura .............. F16K 11/22 137/565.23 |
| 5,887,624 | A | * | 3/1999 | Taniguchi ............... F16K 31/06 303/119.2 |
| 7,328,721 | B2 | * | 2/2008 | Kytola .................... F16K 11/22 73/201 |

(Continued)

FOREIGN PATENT DOCUMENTS

| | | | |
|---|---|---|---|
| CN | 115183031 A | * 10/2022 | |
| EP | 1484555 A1 | * 12/2004 | ........... F23D 14/045 |

OTHER PUBLICATIONS

English Translation of CN-115183031-A.*

*Primary Examiner* — Umashankar Venkatesan
(74) *Attorney, Agent, or Firm* — Miller & Martin PLLC

(57) ABSTRACT

A double flow rate gas solenoid valve has an inlet and at least a first outlet in a housing. First and second solenoids are selectively operable relative to first and second valve seats to establish first and second gas flow paths, respectively. The second flow path has a restriction thereby resulting in a lower gas flow rate through the second flow path than the first flow path. When connected to a common inlet of a burner, at least two, if not three flow rates can be provided by the valve.

17 Claims, 3 Drawing Sheets

(56) References Cited

U.S. PATENT DOCUMENTS

| | | | | |
|---|---|---|---|---|
| 7,644,725 | B2* | 1/2010 | Matsuzawa | F16K 11/22 |
| | | | | 137/240 |
| 9,599,232 | B2* | 3/2017 | Yoshimura | F16K 31/0675 |
| 9,810,429 | B2* | 11/2017 | Vrolijk | F23D 14/36 |
| 10,222,057 | B2* | 3/2019 | Deng | F23N 1/007 |
| 2005/0202361 | A1* | 9/2005 | Albizuri | F23N 1/007 |
| | | | | 431/354 |
| 2011/0000563 | A1* | 1/2011 | Ito | F16K 31/0655 |
| | | | | 137/596.17 |
| 2012/0153199 | A1* | 6/2012 | Nguyen | F16K 31/0679 |
| | | | | 251/129.15 |
| 2018/0038592 | A1* | 2/2018 | Willis | F23C 1/00 |

* cited by examiner

DOUBLE FLOW RATE GAS SOLENOID VALVE

CLAIM OF PRIORITY

This application claims the benefit of U.S. Provisional Application No. 63/195,880 filed Jun. 2, 2021, which is incorporated by reference herein in its entirety.

FIELD OF THE INVENTION

The present invention relates to a double solenoid, dual flow rate, gas valve.

BACKGROUND OF THE INVENTION

Solenoid gas valves typically include an on/off function, but do not normally directly control the flow rate through a valve. When power is supplied to the solenoid valve, the valve opens. When power is removed, the valve closes. Normally, flow rate is controlled by a pressure regulator upstream of the valve and an orifice at the burner.

There is a traditional double solenoid gas valve where there is one inlet and two outlets, both of such outlets typically function in the on/off manner to supply two separate burners (two separate orifices without a way for the valve to vary flow rate (other than on/off) to either valve). This design does not allow for flow rate control within a single valve to any particular burner, by itself.

Flow rate is generally controlled by the diameter of the orifice leading to the burner. In other applications, multiple burners with different orifice diameters (each supplied by its own solenoid valve) could be used to provide different flow rates. However, for many applications it is desirable to have a single burner and orifice while still having the ability to control flow rate which is not currently able to be provided with solenoid gas valves currently in the marketplace.

Another method of controlling flow rates in the prior art is by controlling output pressure. However, more complicated valves include a servo regulator that can be controlled by a stepper motor or other electrically driven motor to adjust the spring force to the desired pressure, such constructions provide added complication cost which is not desirable for at least some applications.

Accordingly, it is desirable to provide a double solenoid gas valve having a fixed gas regulator in cooperation with a fixed orifice.

SUMMARY OF THE INVENTION

It is an object of many embodiments of the present invention to provide an improved double solenoid gas valve for providing at least two flow rates to an outlet of a valve.

It is the object of many embodiments of the present invention to provide a high and low flow double solenoid gas valve.

It is another object of many embodiments of the present invention to provide an improved gas valve utilizing two solenoids directing flow to a common outlet directing flow through at least one, if not two solenoids, to the outlet with different flow rates therethrough the valve seats at the two solenoids to a single burner.

It is another object of many embodiments of the present invention to provide high and low flame rates to a single burner using a double solenoid gas valve to control the flow. The traditional valves in the market, even the double solenoid gas valves available on the market, are unable to do this as they provide the same flow rate to both outlets through both valve seats.

The prior art is not able to provide a flow adjustment to a burner through only a solenoid gas valve. Prior art gas solenoid valves implement on/off control which causes a number of issues. First, customers have to control the flow in other matters which can add additional costs and complexity. Second, the prior art design provides inferior temperature control in many applications since the burner is either fully on or fully off with no middle ground.

Accordingly, the proposed solution utilizes a single gas valve to provide a high flow rate or a low flow rate to a single burner using two solenoids directing flow from a single inlet using a single outlet or to separate outlets which have been joined to a single burner, such as to provide to an orifice of a burner. One of the two solenoids provides high flow and the other provides a low flow. Such a construction can provide a practical and cost effective way to control flow rate.

Many embodiments of the solution incorporate two solenoids that operate independently to provide a high and a low flow rate to the burner. The outlet of the valve can contain an external orifice which provides a maximum desired flow rate to the burner under various conditions.

When a first solenoid is activated, the first flow path is opened and a high flow rate can be provided. When a low flow rate is desired, the first solenoid can be closed, and the second solenoid can be activated so as to provide the desired low flow rate through a second flow path. In order to provide the low flow rate, a restriction can be added to the second solenoid in one of at least two ways.

First, two separate outlets could be provided. An orifice plug configured for a desired low flow rate can be press fit into the outlet for the second solenoid (second flow path). Since the orifice plug has a smaller diameter than the external orifice, a lower flow rate can be provided through the second flow path as compared to the first flow path. Alternatively, the first and second solenoids can flow to a single outlet whereby the seat or another internal portion of the second flow path (or the first flow path) can be machined to a diameter correspondent to the desired flow rate (either small or larger than the other, as appropriate). Since the second flow path at the seat diameter of the second solenoid can be smaller than the external orifice, a lower flow can be provided through the second flow path than that of the larger diameter of the first flow path which proceeds through the first solenoid.

DETAILED DESCRIPTION OF THE PREFERRED EMBODIMENT

Figure 1:
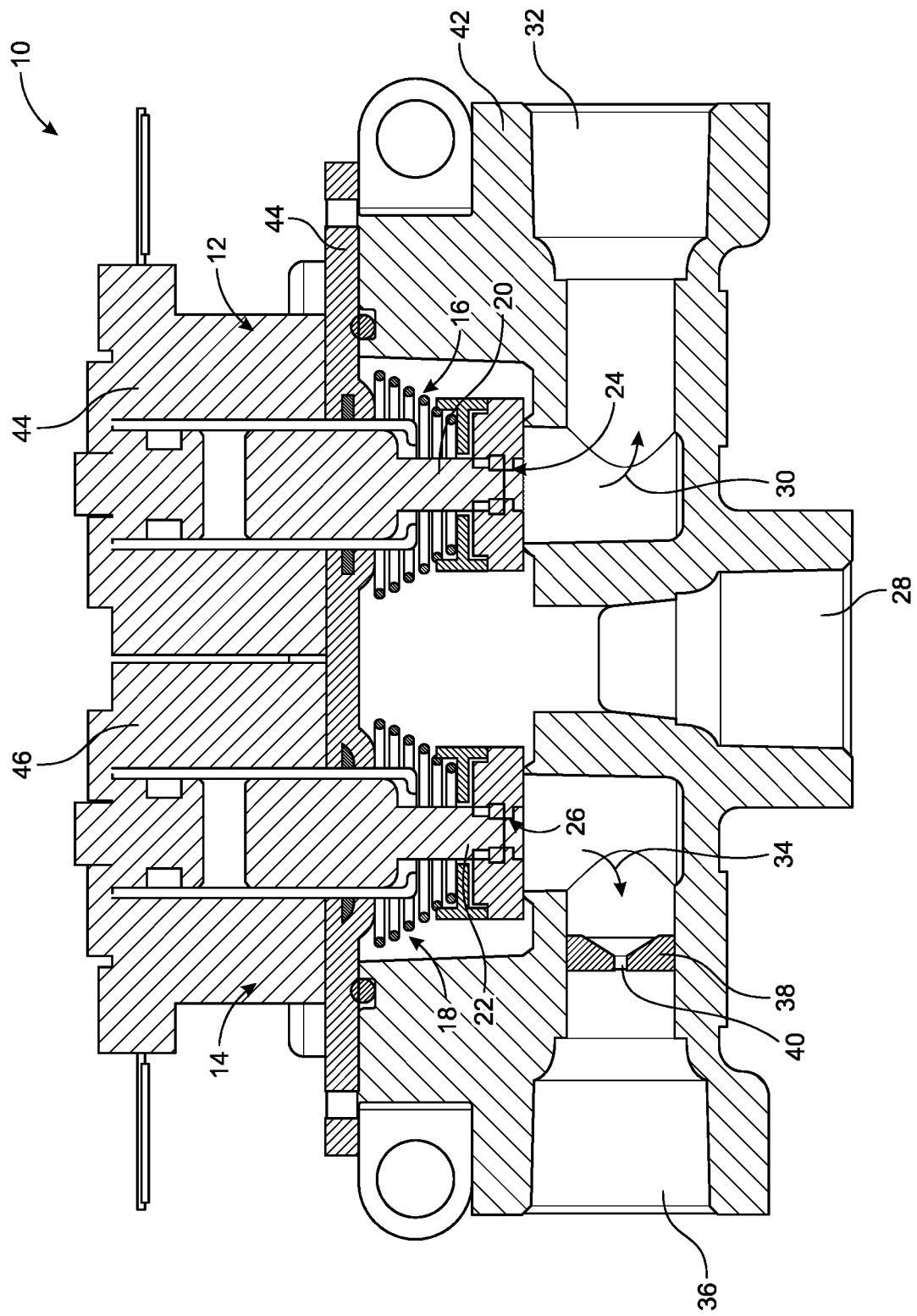
FIG. 1 is a cross sectional view of the valve of the presently preferred embodiment.

FIG. 1 shows a valve 10 having a first solenoid 12 and a second solenoid 14. The first and second solenoids 12,14 are preferably biased by springs 16,18 respectively into the shut position wherein respective pistons 20,22 seat on valve seats 24,26 in the shut configurations. An inlet 28 provides a supply of gas can be directed through a selected one of the valve seats 24,26, selectively, as the solenoid valves 12,14 are opened.

The first solenoid 12, when opened, allows flow through the first valve seat 24 through a first flow path 30 and out a first outlet 32. If the first flow path 30 is secured, a second flow path 34 may be opened by opening the second solenoid 14 to move the second piston 22 off the second valve seat 26 to allow flow out the second outlet 36. The second flow path 34 has an orifice plug 38 or other restrictor which provides a smaller cross sectional area at opening 40 than at valve seat 26 (and smaller than an orifice at the burner down stream (not shown)).

The area at valve seat 26 is illustrated as the same as at first valve seat 24 so that by having the orifice plug 38 (with a smaller cross sectional area) a lower flow is experienced through the second flow path 34 than through the first flow path 30 due to the existence of the orifice plug 38. The orifice plug 38 may be press fit or otherwise inserted into the flow path in the way of the flow path 34 to restrict flow therethrough. Additionally, the cross sectional area of the opening 40 is preferably smaller than the external orifice of the burner (not illustrated).

The first and second solenoids 12,14 preferably positioned relative to a common housing 42 which contains the first and second valve seats 24,26 as well as preferably receiving the spring 16,18 and may have the inlet 28 as well as the outlets 32,36. Solenoid actuators 44,46 may be secured to the housing such as with a cap 44 or otherwise.

Figure 2:
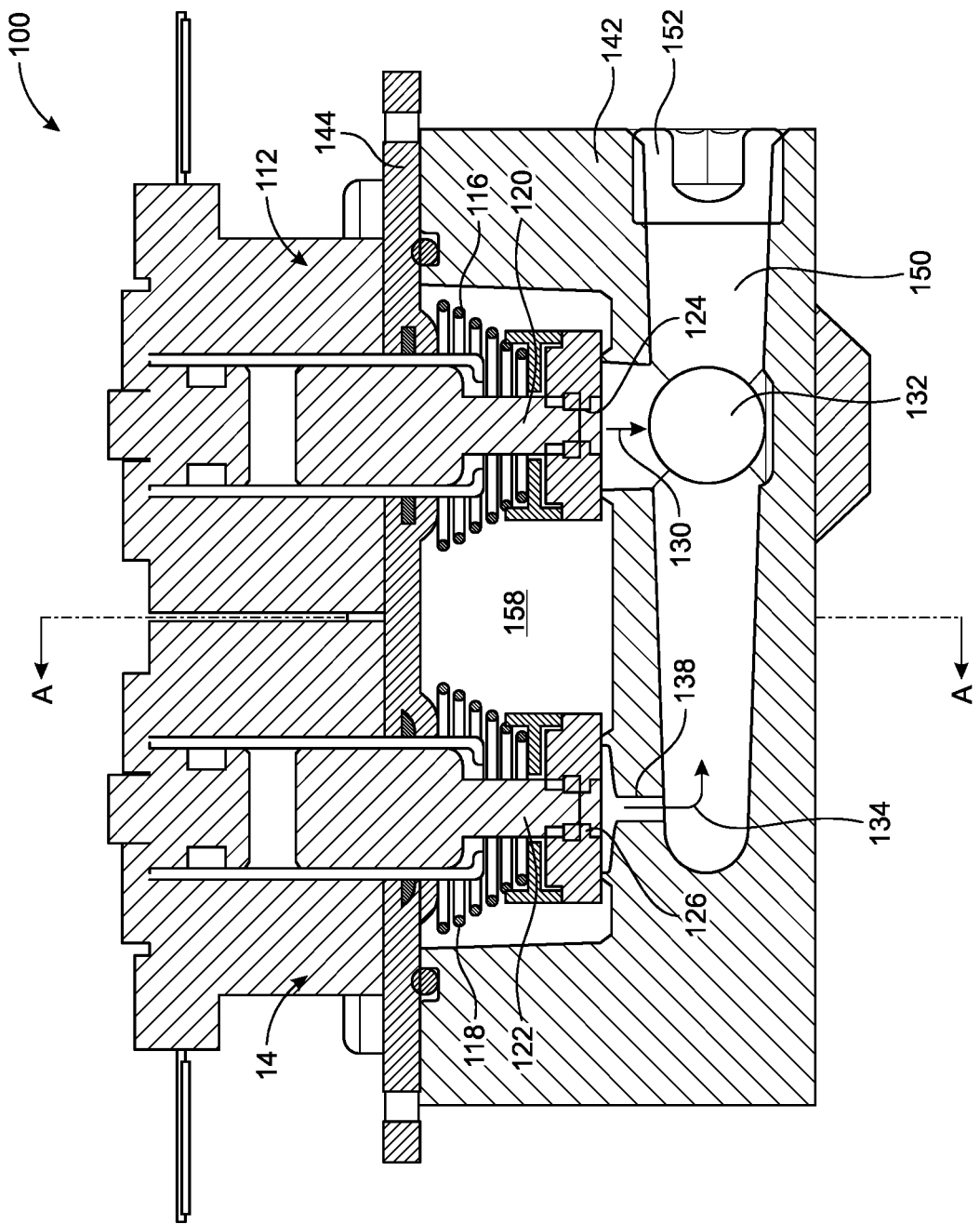
FIG. 2 is a first alternative embodiment of the present invention of the valve of FIG. 1.
Figure 3:
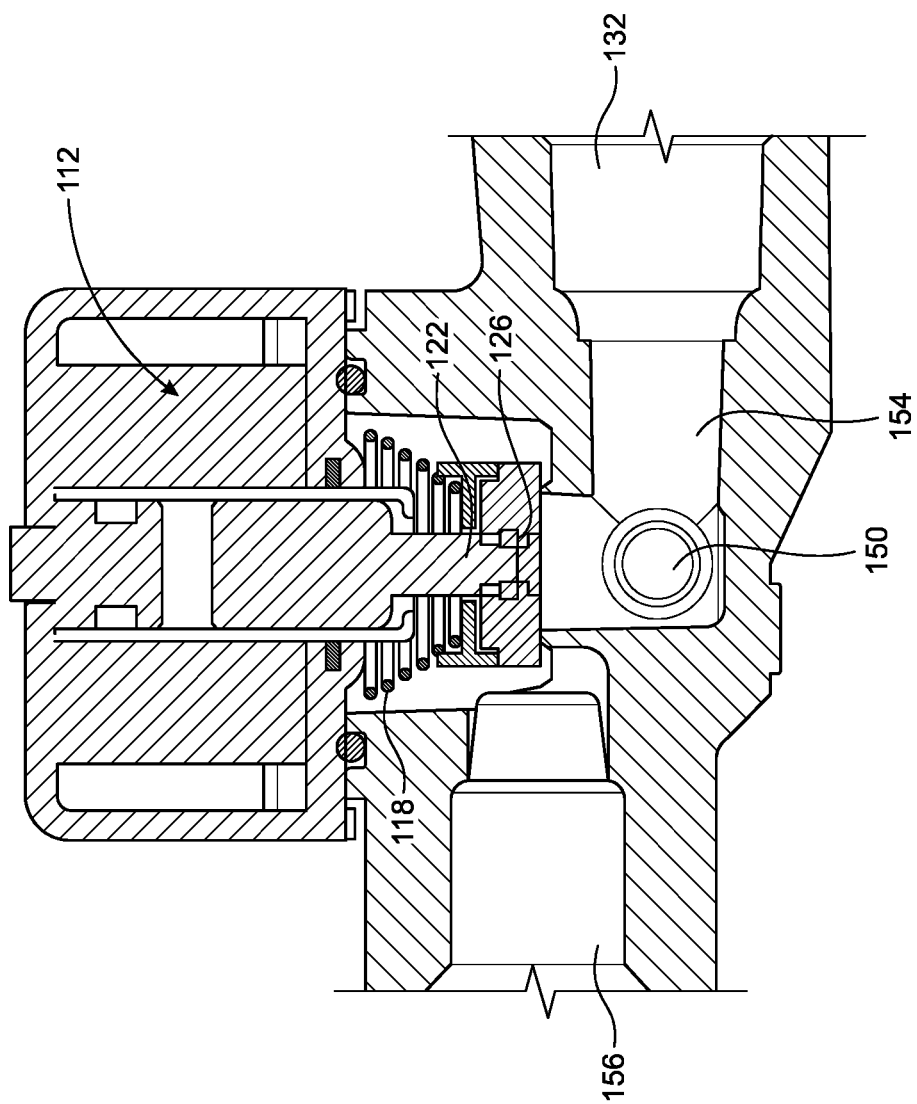
FIG. 3 is a side cross sectional view of the valve shown in FIG. 2.

While the embodiment of FIG. 1 is certainly one way of constructing the valve 10 of the preferred embodiment, an alternatively preferred embodiment of the valve 100 is shown in FIGS. 2 and 3. This embodiment also has first and second solenoids 112,114 which drive first and second pistons 120,122 against springs 116,118 respectively to provide flow through the first and second valve seats 124, 126. One of ordinary skill in the art will see that the first flow path 130 does not pass through as narrow of a restriction 138 as the second flow path 134 which has a machined control diameter provided as the restriction 138 which is a smaller cross sectional area than is provided at and through the first flow path 130. Both flow paths 130,134 dictate flow to a common outlet 132 which proceeds to a burner with an orifice therein (not shown). Cross bore 150 may be machined into housing 142 and then plugged with plug 152 after connecting the first and second flow paths 130,134 to be directed to a common outlet 132 which could occur through an outlet bore 154 which connects up with the cross bore 150 as is shown in FIG. 3. An inlet 156 can direct a flow into the inlet chamber 158 so that flow can proceed through either one or both of the first and second solenoids 112,114 as desired.

One of ordinary skill in the art will quickly see that by selecting either the first or the second solenoid 112,114 to open to provide flow out either a lower or higher flow rate through the first or second flow paths 130,134 can be provided through the outlet 132 to be directed to a burner with an orifice to provide a burner with gas so as to operate various gas appliances. Once again, with this embodiment, the housing 142 receives both valve seats 124,126 as well as the springs 116,118 as well as the inlet 156 and outlet 132. Once again the first and second solenoid 112,114 may be connected with a cap 144 to the housing 142 in a relatively straight forward manufacturing step. The restriction 138 may be machined into the housing 142 before installing the valve seats 126 therein. Other manufacturing techniques ay be employed with various embodiments.

Unlike prior art constructions, a dual solenoid valve can be provided to the marketplace in a cost effective way to provide two different rates of flow to a single burner utilizing two solenoids and the two flow paths through a single valve housing 42,142.

What is claimed is:

1. A double solenoid gas valve comprising:
a housing having an inlet, a first outlet and a second outlet;
first and second valve seats located in the housing in fluid communication with the inlet;
first and second solenoids respectively directing pistons selectively against the first and second valve seats in a closed configuration, and respectively selectively operable between the closed configuration and an open configuration, wherein when the first solenoid is in the open configuration a first fluid flow path is established through the first valve seat and when the second solenoid is in the open configuration, a second fluid flow path is established through the second valve seat;
an inlet chamber receiving portions of the first and second solenoids and through which the first and second valve seats respectively transition from the closed to open configuration;
a restriction in the second fluid flow path within the housing thereby resulting in a lower flow rate through the second fluid flow path than a flow rate through the first flow path when both first and second solenoids are in the open configuration;
a cross bore; and
a plug defining a cavity of the cross bore;
wherein said first valve seat is in fluid communication with the first outlet, and the second valve seat is in fluid communication with the second outlet, and flow thorough the first outlet is not in fluid communication with flow through the second outlet; and
wherein the first outlet is oriented perpendicularly to the cross bore, said cross bore in fluid communication with the inlet through the first and second flow paths.

2. The double solenoid gas valve of claim 1 wherein the restriction is spaced apart from the second valve seat.

3. The double solenoid gas valve of claim 2 wherein the restriction is located downstream of the second valve seat.

4. The double solenoid gas valve of claim 1 wherein the pistons operably moved by the first and second solenoids are spring biased in the closed configuration.

5. The double solenoid gas valve of claim 1 wherein the cross bore extends along a linear axis.

6. The double solenoid gas valve of claim 5 wherein the restriction is at the second valve seat.

7. The double solenoid gas valve of claim 6 wherein the restriction has a first orifice extending through the second valve seat to the cross bore.

8. The double solenoid gas valve of claim 7 wherein a second orifice extends through the first valve seat to the cross bore and the first orifice has a smaller cross sectional area than the second orifice.

9. The double solenoid gas valve of claim 1 wherein the inlet is coplanar with the first outlet.

10. The double solenoid gas valve of claim 1 wherein the inlet is parallel to the first outlet.

11. The double solenoid gas valve of claim 1 wherein the inlet is perpendicular to the first outlet.

12. The double solenoid gas valve of claim 1 wherein first and second solenoids are both in the open configuration thereby providing a third flow rate of fluid greater than the first and second flow rates.

13. A double solenoid gas valve comprising:
a housing having an inlet and at least a first outlet;
first and second valve seats located in the housing in fluid communication with the inlet;
first and second solenoids respectively directing pistons selectively against the first and second valve seats in a closed configuration, and respectively selectively operable between the closed configuration and an open configuration, wherein when the first solenoid is in the open configuration a first fluid flow path is established through the first valve seat and when the second solenoid is in the open configuration, a second fluid flow path is established through the second valve seat;
a restriction in the second fluid flow path thereby resulting in a lower flow rate through the second fluid flow path than a flow rate through the first flow path when both first and second solenoids are in the open configuration; and
wherein said first valve seat is in fluid communication with the first outlet and the second valve seat is in fluid communication with the first outlet so that the first and second flow paths proceed through the first outlet when established.

14. The double solenoid gas valve of claim 13, wherein the cap and housing form an inlet chamber upstream of the first and second valve seats.

15. The double solenoid gas valve of claim 14 wherein the inlet chamber is in fluid communication respectively with both the first and second valve seats when the respective first and second solenoid is in the open configuration.

16. The double solenoid gas valve of claim 15 wherein the pistons operably moved by the first and second solenoids are spring biased in the closed configuration.

17. The double solenoid gas valve of claim 14 wherein the first and second solenoids are both in the open configuration thereby providing a third flow rate of fluid greater than the first and second flow rates.

* * * * *